(12) United States Patent
Nishio et al.

(10) Patent No.: US 6,789,259 B2
(45) Date of Patent: Sep. 7, 2004

(54) RECORDING MEDIA UNIT

(75) Inventors: Atsushi Nishio, Mito (JP); Takashi Kawasaki, Mito (JP); Kazuhiro Okazaki, Mito (JP); Satoru Karahashi, Mito (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 106 days.

(21) Appl. No.: 10/307,842

(22) Filed: Dec. 2, 2002

(65) Prior Publication Data

US 2003/0103432 A1 Jun. 5, 2003

(30) Foreign Application Priority Data

Dec. 5, 2001 (JP) .......................................... 2001-370936

(51) Int. Cl.[7] .............................................. G11B 33/02

(52) U.S. Cl. .................................... 720/600; 369/75.11

(58) Field of Search ....................... 720/600; 369/75.11, 369/75.21, 77.11, 77.21, 75.1, 75.2, 77.1, 77.2; 360/99.12, 99.06, 85

(56) References Cited

U.S. PATENT DOCUMENTS

| | | | | | |
|---|---|---|---|---|---|
| 5,732,057 | A | * | 3/1998 | Okabe et al. | 369/75.1 |
| 5,748,595 | A | * | 5/1998 | Nakajima | 369/77.2 |
| 5,912,870 | A | * | 6/1999 | Kanno et al. | 369/77.2 |
| 6,324,147 | B2 | * | 11/2001 | Kanatani et al. | 369/77.2 |

* cited by examiner

Primary Examiner—Allen Cao
(74) Attorney, Agent, or Firm—Ladas & Parry

(57) ABSTRACT

A recording media unit includes a slot through which a recording media is inserted into and ejected out of the recording media unit, a first shutter, attached to the recording media unit, that closes the slot in a state where the recording media is not accommodated in the recording media unit, and a second shutter, pivotably attached to the recording media unit, that closes the slot in a state where the recording media is accommodated in the recording media unit. The first shutter is configured to open in accordance with an insertion operation of the recording media in which the recording media pushes the first shutter, and the second shutter is configured to rotate about a pivot at one end of the second shutter in accordance with an ejection operation of the recording media in which the recording media pushes the second shutter.

5 Claims, 9 Drawing Sheets

RECORDING MEDIA UNIT

BACKGROUND OF THE INVENTION

1. Field of the Invention

The present invention relates to a recording media unit and more particularly to a shutter mechanism for a recording media unit in which a recording media is loaded by being entirely accommodated therein and that is provided for by closing a slot of said recording media unit through which the recording media is inserted and ejected.

2. Description of the Related Art

A recording media unit configured to load a recording media is provided with a shutter mechanism for closing a slot through which the recording media is inserted and ejected. A typical shutter mechanism includes a single shutter that closes a slot in a state where the recording media is not loaded. With such a shutter mechanism, the slot is closed by a rear end part of the recording media itself in a state where the recording media is loaded.

Conventionally, a recording media unit is also known in which a recording media is entirely accommodated and which includes two shutters, i.e., first and second shutters, that are provided at a slot of the recording media unit where through the recording media is inserted and ejected. The first shutter closes the slot in a state where the recording media is not loaded and the second shutter closes the slot in a state where the recording media is loaded.

According to the above-structure, a link mechanism is provided that is associated with the second shutter such that the link mechanism operates in an interlocked manner with a loading operation of the recording media so as to close the second shutter and the link mechanism operates in an interlocked manner with an ejection operation of the recording media so as to open the second shutter.

Such a recording media unit of the related art is provided with a link mechanism, having at least a sliding member, or rod, and a pivoting member, in association with the shutter and thus has drawbacks that a large number of components are required for the link mechanism, that the structure becomes complex and that it is difficult to minimize the structure of the recording media unit.

Also, in a case where the link mechanism fails to operate smoothly, the second shutter will not open and close smoothly. Further, if the link mechanism becomes inoperative for some reason, it may happen that the second shutter cannot open or close.

SUMMARY OF THE INVENTION

Accordingly, it is a general object of the present invention to provide a recording media unit that can obviate the drawbacks described above.

It is another and more specific object of the present invention to provide a recording media accommodating unit having a first and second shutter in which the second shutter can operate without requiring a link mechanism for pivoting the second shutter.

In order to achieve the above objects according to the present invention, a recording media unit including a slot through which a recording media is inserted into and ejected out of the recording media unit, a first shutter, attached to the recording media unit, that closes the slot in a state where the recording media is not accommodated in the recording media unit, and a second shutter, pivotably attached to the recording media unit, that closes the slot in a state where the recording media is accommodated in the recording media unit is provided, wherein the first shutter is configured to open in accordance with an insertion operation of the recording media in which the recording media pushes the first shutter, and the second shutter is configured to rotate about a pivot at one end of the second shutter in accordance with an ejection operation of the recording media in which the recording media pushes the second shutter.

According to the invention described above, the structure of the recording media unit can be simplified and minimized and also there will be no failure related to operations of the link mechanism. Therefore, an opening and closing operations of the first and second shutters can be implemented with an improved reliability.

DETAILED DESCRIPTION OF THE PREFERRED EMBODIMENTS

Figure 1:
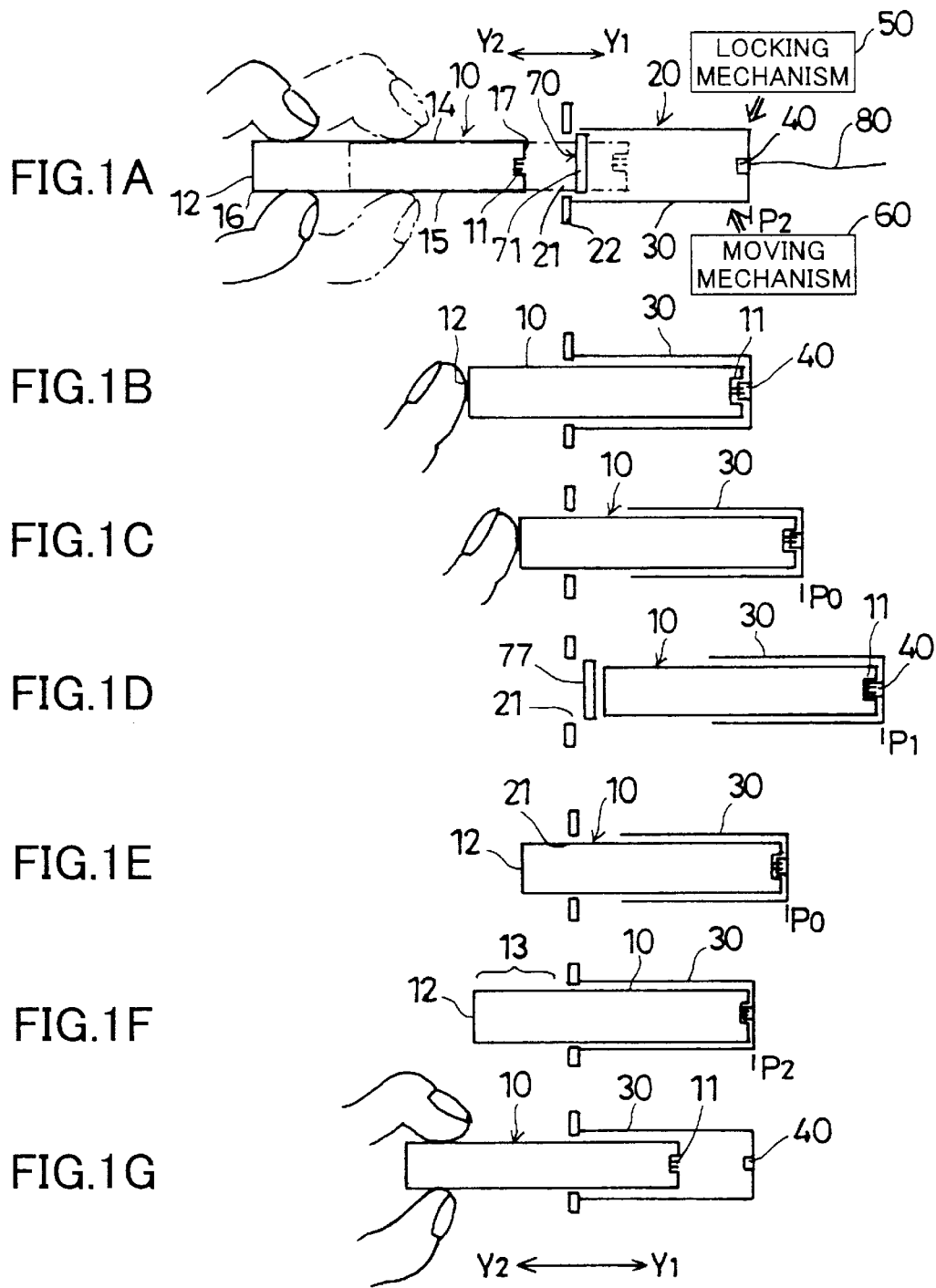
FIGS. 1A through 1G are schematic diagrams showing a recording media unit of an embodiment according to the present invention.

In the following, principles and embodiments of the present invention will be described with reference to the accompanying drawings.

First, for the sake of convenience, a recording media unit 20 of an embodiment of the present invention will be described in general with reference to FIGS. 1A through 1G. In the figures, Y1 indicates a direction along which a recording media 10 is inserted and Y2 indicates a direction along which the recording media 10 is ejected. When in use, the recording media unit 20 is incorporated into electronic appliances such as a digital camera or a computer. The recording media 10 has a substantially rectangular box shape and is provided with a connector 11 on the leading edge towards the direction of insertion. A storage element such as a solid-state element or a magnetic disk is provided inside the recording media 10.

The recording media unit 20 includes a front bezel 22 provided with a slot 21 via which the recording media 20 is inserted and ejected, a recording media holder 30 having a box shape for holding the inserted recording media 10 and being movable along the Y1-Y2 direction, a connector 40 provided on the inner wall at the Y1-end of the recording media holder 30 whereto the connector 11 is to be connected, a recording media holder locking mechanism 50, a recording media holder moving mechanism 60 and a shutter mechanism 70. The shutter mechanism 70 includes a first shutter 71 and a second shutter 75. The second shutter 75 may include a shutter main body 77. A flexible flat cable 80 is connected to the Y1-end of the connector 40.

The recording media holder locking mechanism 50 is configured to lock the recording media holder 30 such that it does not move in the Y1-direction and to unlock the recording media holder 30 when the recording media 10 has been inserted into the recording media holder 30 to a position where the connector 11 is connected to the connector 40. The recording media holder moving mechanism 60 moves the recording media holder 30 that has moved in the Y1-direction to a position beyond position P0 to position P1 and moves recording media holder 30 that has moved in the Y2-direction to a position beyond position P0 to position P2. The first shutter 71 closes the slot 21 when the recording media 10 is not accommodated in the recording media unit 20. The shutter main body 77 of the second shutter 75 closes the slot 21 when the recording media 10 is accommodated in the recording media unit 20.

In a state before accommodating the recording media 10, the recording media unit 20 is in a state shown in FIG. 1A. The recording media holder 30 is situated at position P2 and is locked by the locking mechanism 50. The first shutter 71 is closing the slot 21.

As can be seen in FIG. 1A, the operator holds the recording media 10 by hand, such that connector 11 is on the Y1 side, and inserts the recording media 10 through the slot 21 such that it pushes and opens the first shutter 71 and is inserted into the recording media unit 20. As can be seen in FIG. 1B, the operator pushes the end surface 12 of the recording media 10 with a finger and forces the recording media 10 into the slot 21.

With such an operation, first, as shown in FIG. 1B, the connector 11 is connected to the connector 40 which is the counterpart of the connector 11. Then, the locking mechanism 50 is unlocked. The recording media 10 pushes the recording media holder 30 and the connector and is further inserted into the recording media unit 20. Accordingly, the recording media holder 30 and the connector 40 are moved in the Y1-direction.

When the recording media holder 30 passes position P0 as shown in FIG. 1C, the holder moving mechanism 60 further moves the recording media holder 30 in the Y1-direction to position P1 shown in FIG. 1D. Since the connector 11 is connected to the connector 40, the recording media 10 moves together with the recording media holder 30 in the Y1-direction and is pulled into the recording media unit 20 such that it is entirely accommodated in the recording media unit 20. Also, the shutter main body 77 of the second shutter 75 closes the slot 21.

This is a state where the recording media 10 is loaded in the recording media unit 20 and, in this state, information may be written in the recording media 10.

In order to eject the recording media 10, for example after completion of an information writing operation, the operator carries out an eject operation by pressing an ejection button. As a result of the ejection operation, as can be seen in FIG. 1E, the recording media holder 30 moves in the Y2-direction and the second shutter 75 is pressed and opened by the recording media 10. Then, the rear surface 12 of the recording media 10 protrudes out of the slot 21. When the recording media holder 30 passes position P0, the recording media holder moving mechanism 60 further moves the recording media 30 in the Y2-direction to position P2 shown in FIG. 1F.

In this state, as can be seen in FIG. 1G, the operator holds a protruded part 13 of the recording media 10 that protrudes out of the slot 21 and pulls it strongly in the Y2-direction. Accordingly, the connector 11 is disconnected from the connector 40 and the recording media 10 is removed from the recording media unit 20. After removal of the recording media 10 from the recording media unit 20, the first shutter 71 closes the slot 21 as shown in FIG. 1A.

Now, the recording media unit 20 of an embodiment of the present invention will be described in detail. The operation of the recording media unit 26 will be described by referring again to FIGS. 1A through 1F.

Figure 2:
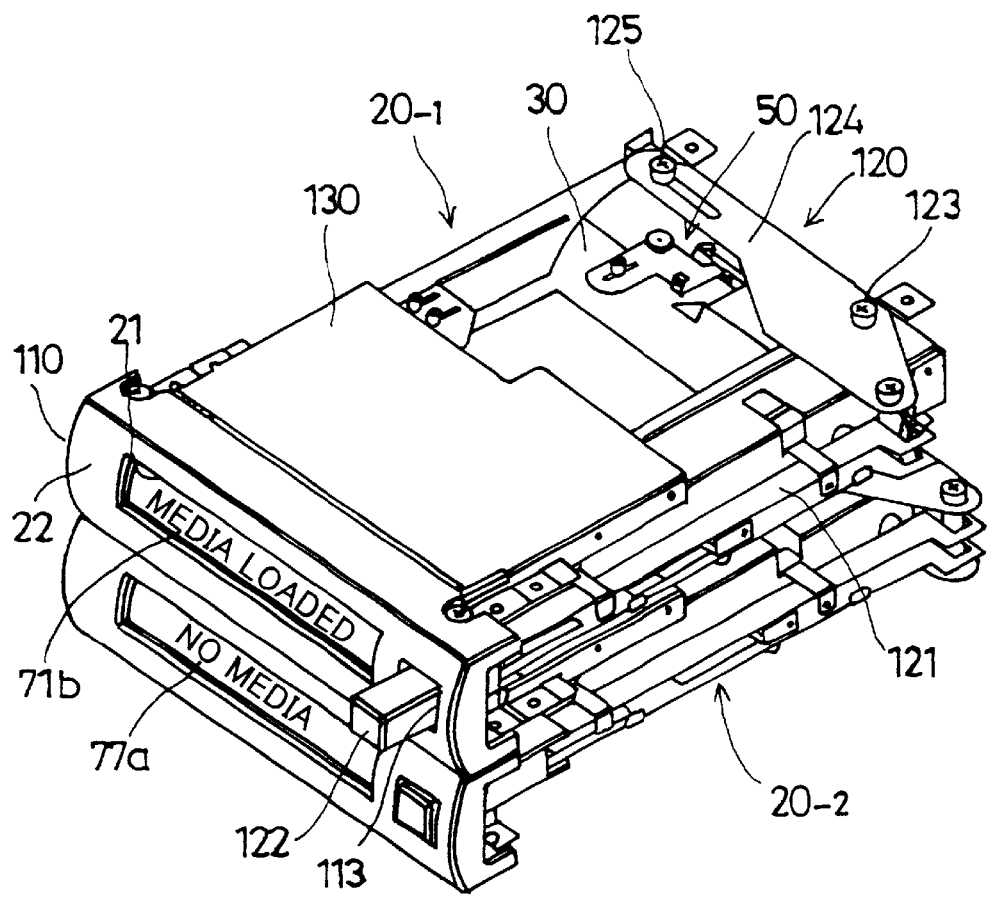
FIG. 2 is a perspective diagram of the recording media units of the embodiment of the present invention that are coupled in a stacked manner, viewed from an upper viewpoint from the front bezel side.
Figure 3:
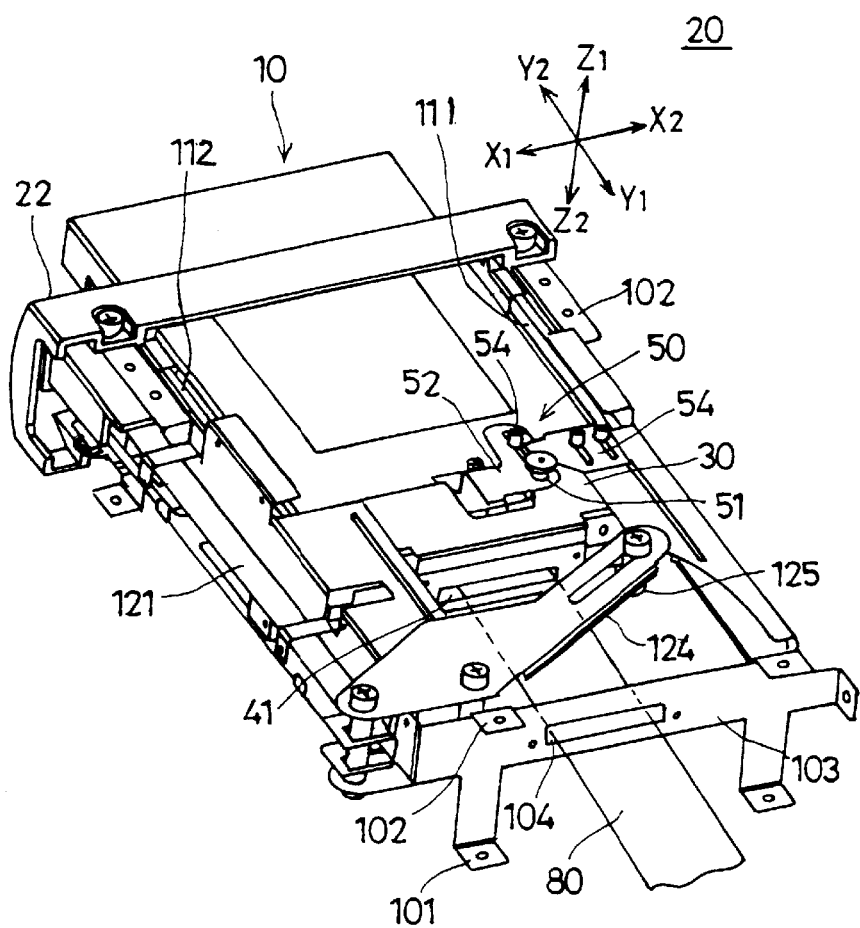
FIG. 3 is a perspective diagram of the recording media unit of the present invention viewed from an upper viewpoint of the backside.
Figure 4:
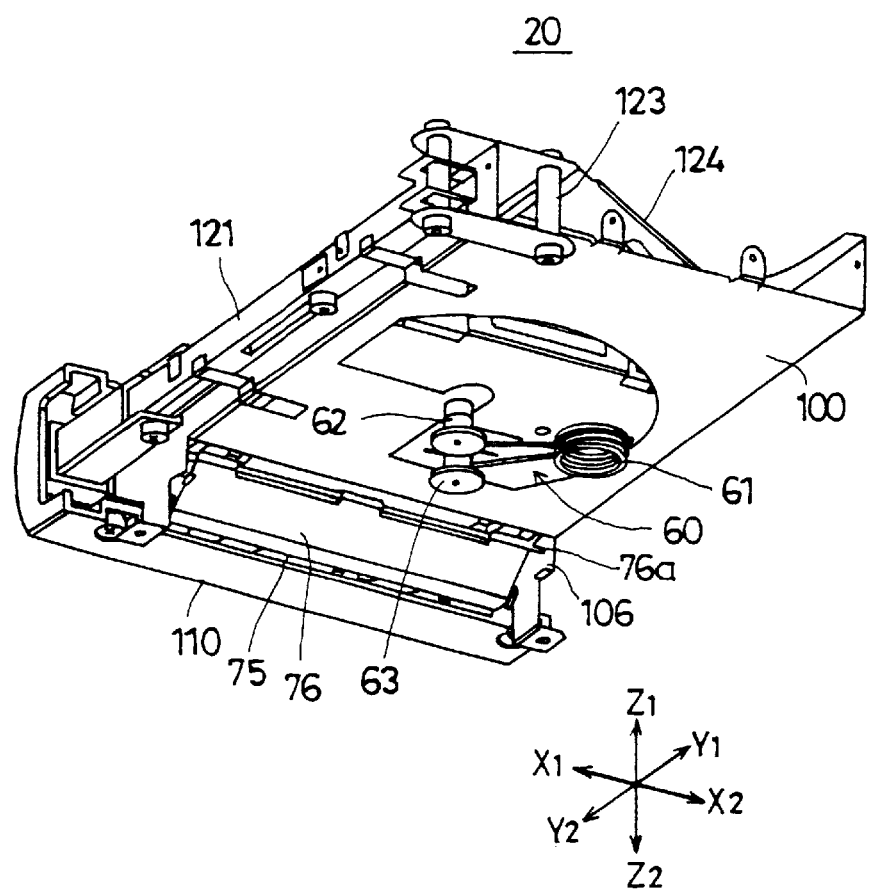
FIG. 4 is a perspective diagram of the recording media unit of the present invention viewed from a lower viewpoint of the backside.
Figure 5:
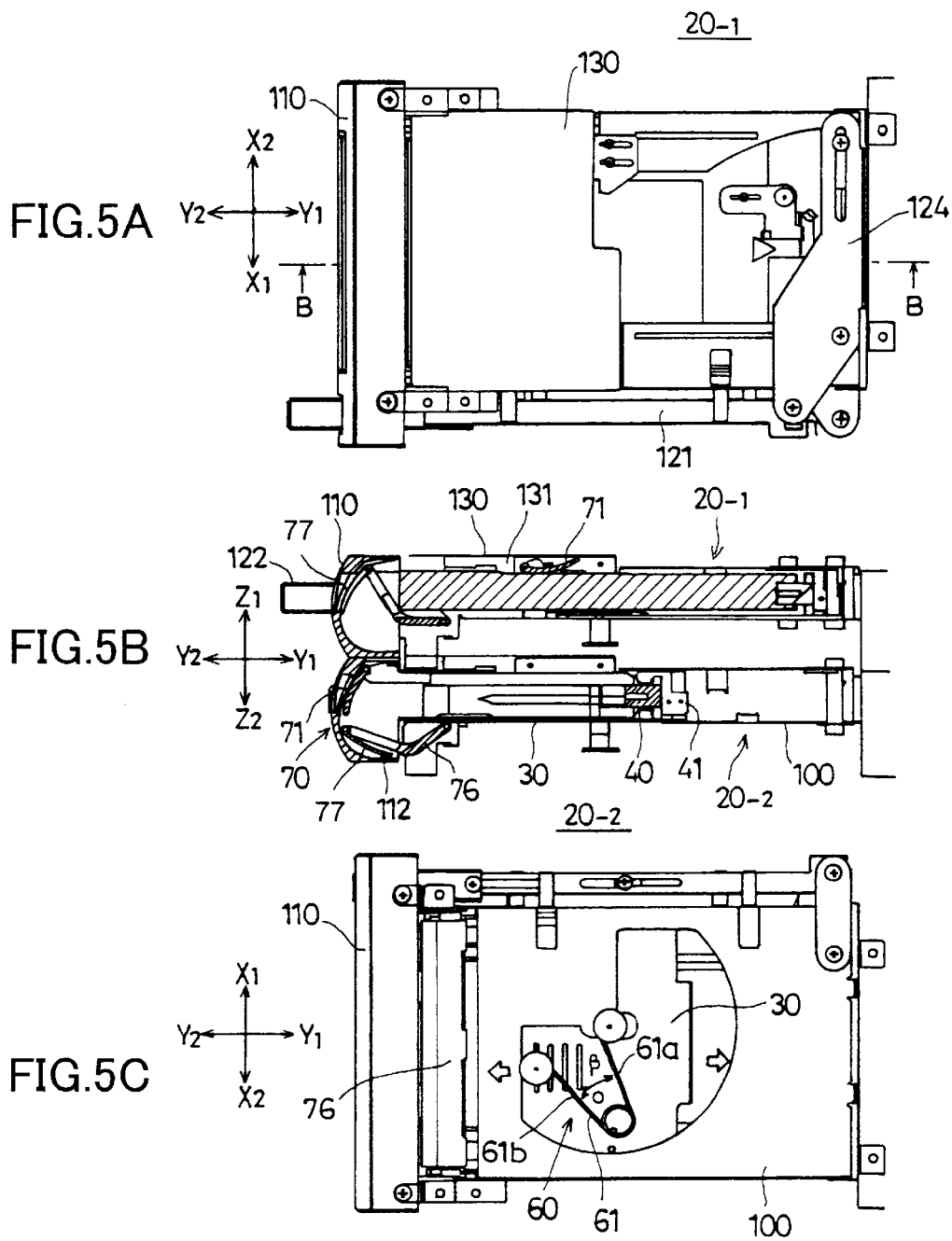
FIGS. 5A through 5C are a plan view, a cross-sectional view along line B—B of FIG. 5A and a bottom view, respectively, of the recording media unit of the present invention.

FIG. 2 is a perspective diagram of the recording media units 20 that are coupled in a stacked manner, viewed from an upper viewpoint from the front bezel side. FIG. 3 is a perspective diagram of the recording media unit 20 viewed from an upper viewpoint from the backside. FIG. 4 is a perspective diagram of the recording media unit 20 viewed from a lower viewpoint from the backside. FIGS. 5A through 5C are a plan view, a cross-sectional view along line B-B of FIG. 5A and a bottom view, respectively, of the recording media unit of the present invention. In the figures, X1-X2 indicates a width-wise direction, Y1-Y2 indicates a depth-wise direction and Z1-Z2 indicates a height-wise direction. In each figure, those components corresponding to the components shown in FIGS. 1A through 1G are indicated with same reference numerals.

FIG. 2 shows a state where the recording media units 20-1 and 20-2 are stacked and coupled. The upper recording media unit 20-1 is in a state where the recording media 10 is loaded in the recording media unit 20-1 and the lower recording media unit 20-2 is in a state where the recording media 10 is not loaded in the recording media unit 20-2.

The recording media unit 20 generally includes a base member 100, a front member 110, a recording media holder 30, a connector 40, a recording media holder locking mechanism 50, a recording media holder moving mechanism 60, a shutter mechanism 70, an ejection mechanism 120 and a cover member 130.

As can be seen in FIGS. 2 and 4, the base member 100 is provided on the Z2-side of the recording media unit 20 and supports the front member 110, the locking mechanism 50, the holder moving mechanism 60, the shutter mechanism 70 and the ejection mechanism 120. As can be seen in FIG. 3, the base member 100 is provided with four leg parts 101 and receiving parts 102 on the Y2 side at both ends of the width-wise direction and on the Y1 side at both ends of the width-wise direction. The recording media unit 20 can be used alone or may be used in a stacked and coupled state. For example, as shown in FIGS. 2 and 5B, two recording media units 20-1 and 20-2 may be stacked and coupled with the leg parts 101 of the upper recording media unit 20-1 being secured to the receiving parts 102 of the lower recording media unit 20-2.

As can be seen in FIGS. 2, 5A and 5B, the cover member 130 is provided adjacent the front bezel 22 on the Y1-side of the front bezel 22 and its X1-X2 edges are secured to the base member 100 such that it covers the upper side of the recording media holder 30. A space 131 is formed between the cover member 130 and an upper surface 14 of the loaded recording media 10 so as to accommodate the first shutter 71 that is in an open and horizontal state.

As can be seen in FIG. 3, the front member 110 is secured on the Y2-side of the base member 100 and includes the front bezel 22 in which the slot 21 is formed and two arm parts 111 and 112 extending from both end parts of the slot 21 of the front bezel 22.

As can be seen in FIGS. 3 and 5B, the recording media accommodating holder 30 has a substantially rectangular shaped cross section with one end being open and has a dimension adapted to receive the recording media 10. The recording media holder 30 is supported by the arm parts 111 and 112 such that it surrounds the arm parts 111 and 112 and is movable in the Y1-Y2 direction while being guided by the arm parts 111 and 112. The recording media holder 30 holds the Y1-end of the inserted recording media 10. The connector 40 is attached on the Y1-end of the holder 30 such that it faces towards the Y2-direction. The connector 40 is provided with a further connector part 41 on its Y1-side. Contact terminals of the connector 40 extend up to the connector part 41. As shown in FIG. 3, a connector provided at the end of the flexible flat cable 80 is connected to the connector 41. The flexible flat cable 80 is guided through a hole 104 of a wall 103 that extends along the Z1-Z2 direction on the Y1 side of the base member 100.

As shown in FIG. 3, the recording media holder locking mechanism 50 includes a locking arm 52 that is pivotably supported by a shaft 51 on an upper surface of the recording media holder 30, a locking plate 53 that is attached to the base member 100, a locking pin 54 that is provided on the locking arm 52 and a torsion coil spring. Normally, the locking pin 54 is engaged to the locking plate 53 such that the recording media holder 30 is situated at position P2 and is locked so as not to move in the Y1-direction. Even if the recording media 10 is forced in, the position of the connector 40 is fixed and the connector 11 is positively connected to the connector 40. By inserting the recording media 10 up to a position where the connector 11 is connected to the connector 40, a front end surface 17 in the Y1-direction of the recording media 10 presses and pivots the locking arm 52. Then the locking pin 54 disengages from the locking plate 53 such that the locking mechanism 50 is unlocked. The recording media holder 30 and the connector 40 are pressed by the recording media 10 that is being inserted and are displaced in the Y1-direction.

As can be seen in FIGS. 4 and 5C, the recording media holder moving mechanism 60 makes use of the torsion coil spring 61 having an arm part 61a and a further arm part 61b. The arm part 61a is fitted to a pin 62 that is planted in the lower surface of the base member 100 and the further arm part 61b is fitted to a pin 63 planted in the lower surface of the recording media holder 30. When the recording media holder 30 at position P2 is moved in the Y1-direction, an angle β between the arm part 61a and the arm part 61b of the torsion coil spring 61 becomes smaller and becomes the smallest at position P0. After passing P0, the angle β becomes greater and the recording media holder 30 is displaced in the Y1-direction up to position P1 due to a spring force exerted by the torsion coil spring 61. When the recording media holder 30 at position P1 is moved in the Y2-direction, an angle β between the arm part 61a and the arm part 61b of the torsion coil spring 61 becomes smaller and becomes the smallest at position P0. After passing P0, the angle β becomes greater and the recording media holder 30 is displaced in the Y2-direction up to position P2 due to a spring force exerted by the torsion coil spring 61.

As can be seen in FIG. 5B, the shutter mechanism 70 includes the first shutter 71 that closes the slot 21 while the recording media 10 is not accommodated and the second shutter 75 having shutter main body 77 that closes the slot 21 while the recording media 10 is accommodated.

As shown in FIG. 2, the ejection mechanism 120 includes a rod 121 that is supported on the X1-side of the base member 100 such that it is movable along the Y1-Y2 direction, an ejection button 122 that protrudes out of an opening 113 provided in the front bezel 22, an ejection lever 124 attached to a shaft member 123 that is secured on the Y1-end side of the base member 100 and an ejection pole 125 at the X2-direction end of the ejection lever 124. The Y1-end of the rod 121 is linked to the X1-end of the ejection lever 124. The ejection pole 125 opposes the Y1-direction end of the recording media holder 30. In a state where the recording media 10 is not loaded in the recording media unit 20, the ejection button 122 is retracted in the opening 113, which is clearly shown by the lower recording media unit 20-2. In a state where the recording media 10 is loaded in the recording media unit 20, the ejection button 122 protrudes from the opening 113, which is clearly shown by the upper recording media unit 20-1.

By pressing the ejection button 122, the ejection lever 124 is pivoted in an anticlockwise direction when viewed in a plan view. Then, the ejection pole 125 presses the recording media holder 30 to displace it in the Y2-direction.

In order to accommodate the recording media 10, the operator holds the recording media 10 and inserts it into the slot 21 in which an indication part 77a "NO MEDIA" is visible and forces it into the slot 21. As a result, the connector 11 is connected to the connector 40 and then the locking mechanism 50 is unlocked. Then, the recording media holder moving mechanism 60 operates such that the recording media 10 is pulled inside and accommodated as is shown in FIG. 5B for the case of the upper recording media unit 20-1.

In order to eject the recording media 10 after an information-writing operation, the operator presses the ejection button 122. With this operation, the ejection mechanism 120 operates and the recording media holder 30 is displaced along the Y2-direction. Then, the recording media holder moving mechanism 60 operates from a predetermined intermediate position such that the recording media holder 30 is displaced by the recording media holder moving mechanism 60 and the rear end part 12 of the recording media 10 protrudes from the slot 21 as can be seen in FIG. 3.

Referring now to FIGS. 6, 7A–7D and 8A–8C, the shutter mechanism 70 of the present invention will be described.

Figure 6:
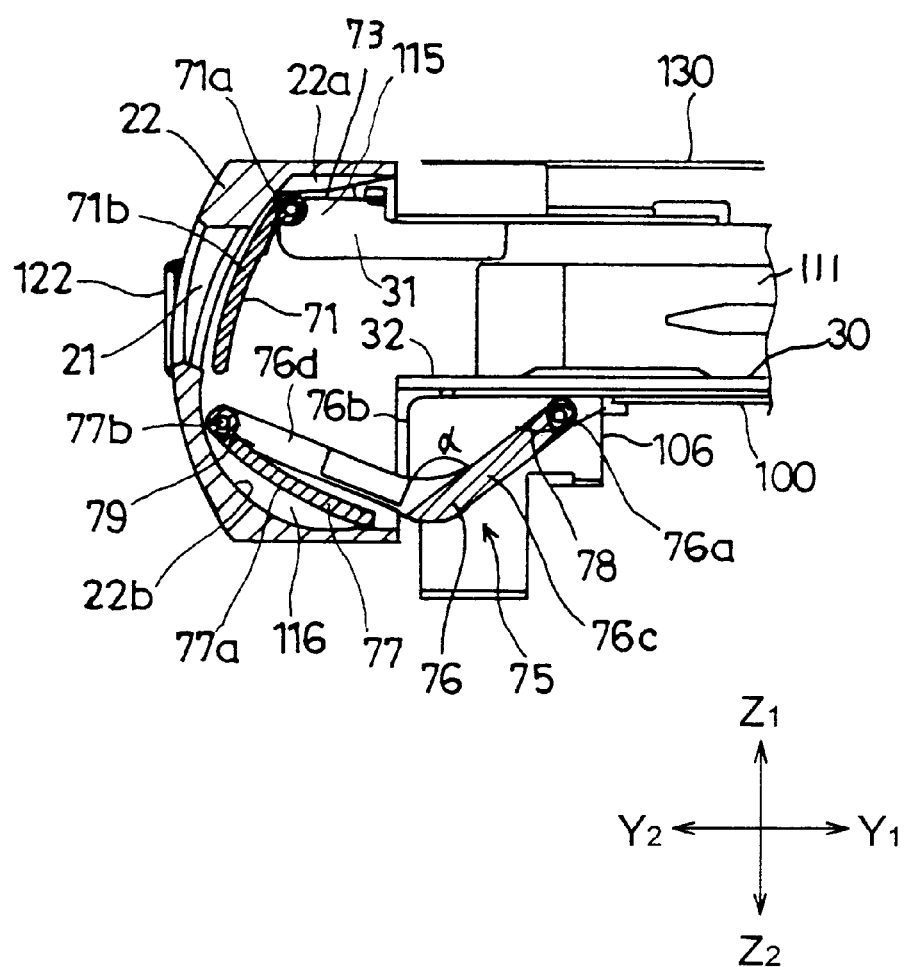
FIG. 6 is an enlarged diagram of the shutter mechanism of the present invention.
Figure 7A:
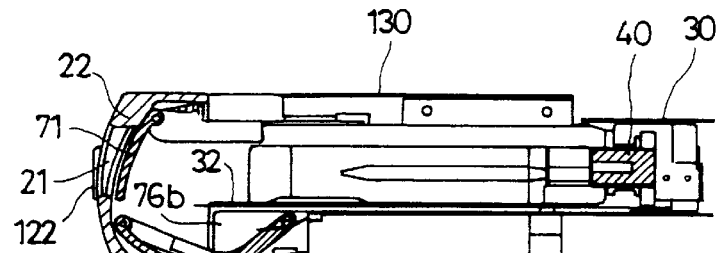
FIGS. 7A through 7D are diagrams showing an operation of the shutter mechanism of the present invention upon inserting a recording media.
Figure 7B:
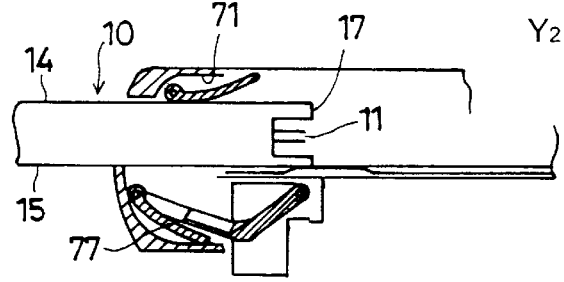
Figure 7C:
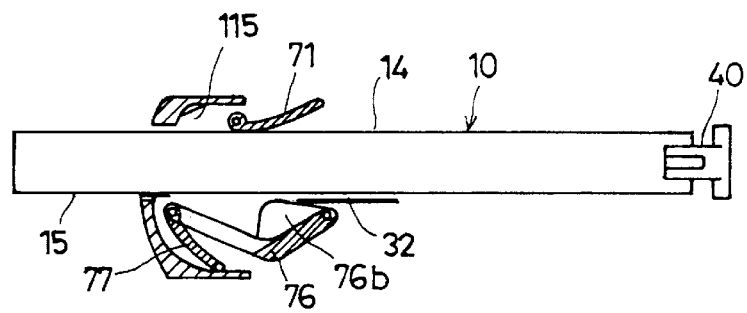
Figure 7D:
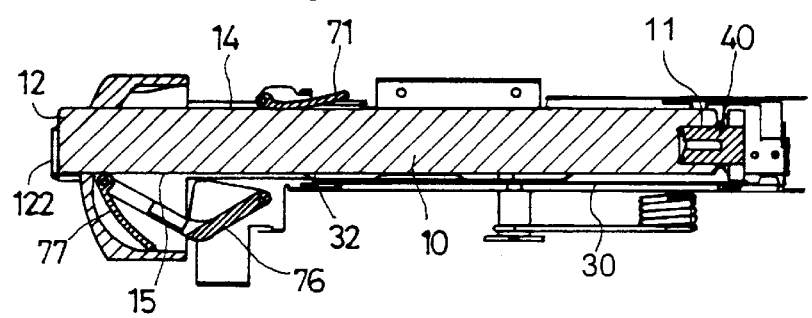
Figure 8A:
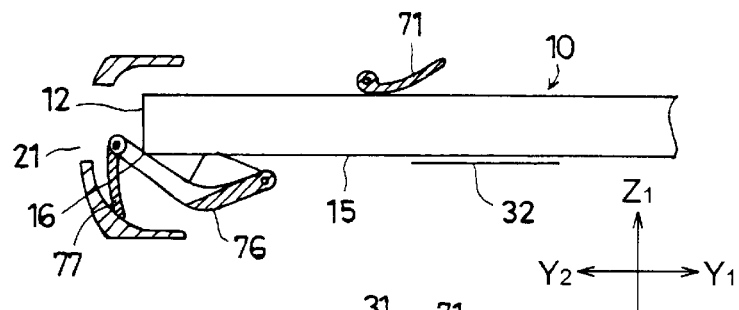
FIGS. 8A through 8C are diagrams showing an operation of the shutter mechanism of the present invention upon inserting a recording media that follow the operation of FIGS. 7A through 7D.
Figure 8B:
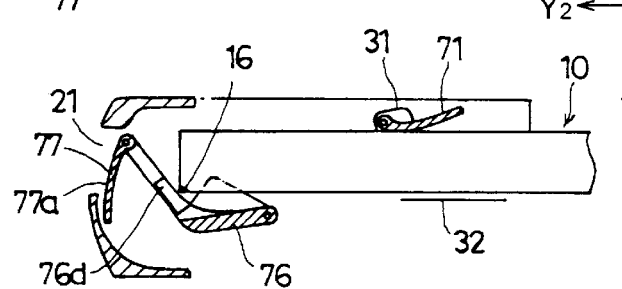
Figure 8C:
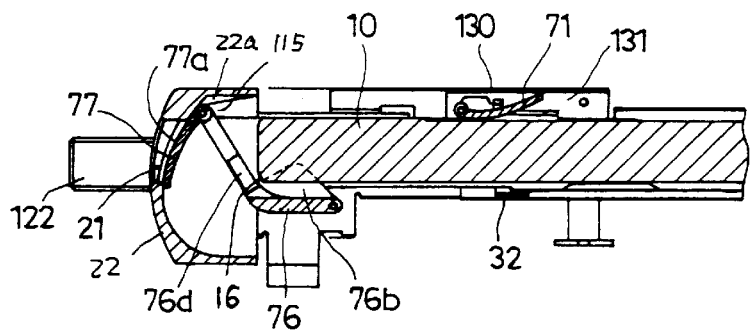

FIGS. 6 and 7A show a state before inserting the recording media 10, FIGS. 7B–7D, 8A and 8B show states during a process of inserting the recording media and FIG. 8C shows a state where the recording media 10 is accommodated. During an ejection operation of the recording media 10, the shutter mechanism 70 operates in a reversed order as compared to the above-mentioned process.

As shown in FIG. 6, the shutter mechanism 70 includes the first shutter 71 and the second shutter 75 having the shutter main body 77.

On the Y1-side of the front bezel 22, there is a space 115 at the Z1 side of the slot 21 and a space 116 at the Z2 side of the slot 21. The front bezel 22 is provided with a rib part 22a that protrudes from the upper surfaces towards the space 115. Reference numeral 22b indicates an arcuate surface at the backside of the front bezel 22 that is exposed to the space 116.

The first shutter 71 which is an upper shutter is pivotably supported at its upper side such that a shaft member 71a is fitted in holes formed through side plate parts 31 at X1 and X2 sides of the recording media holder 30 and protruding towards the Y2-direction. Further, the first shutter 71 is biased in the clockwise direction in FIG. 6 by means of the torsion coil spring 73.

In the state where the recording media 10 is not loaded, as can be seen in FIGS. 6 and 7A, the first shutter 71 closes the slot 21. As in the case of the lower recording media unit 20-2 shown in FIG. 2, the indication part 77a "NO MEDIA" is exposed in the slot 21. The shaft member 71a of the first shutter 71 and a surrounding part is situated within the space 115 at the backside of the front bezel 22.

The second shutter 75 includes arm plate members 76 and the shutter main body 77 that serves as a lower shutter. The arm plate member 76 has a substantially V-shaped cross section and is pivotably supported such that both ends of a shaft part 76a are fitted into a hole of each of flange parts 106 of the base member 100. Further, the arm plate members 76 are biased in an anticlockwise direction in FIG. 6 by means of torsion coil springs 78. The arm plate member 76 includes a base side plate part 76c near the shaft member 76a, a tip side plate part 76d that forms an angle α against the base side plate part 76d, and a rib part 76b at an upper side of the base side plate part 76c. The shutter main body 77 has an indication part 77a "MEDIA LOADED" and is pivotably supported such that a shaft member 77b is fitted through a hole at the tip of the arm plate member 76. Further, the second shaft 77 is biased in the clockwise direction in FIG. 6 by means of the torsion coil spring 79.

As can be seen in FIGS. 6 and 7A, in a state where the recording media is not loaded, the Y2-end part of the base plate part 32 of the recording media holder 30 restricts the rib part 76b. The arm plate member 76 is pivoted in an anticlockwise direction in FIG. 6. The shutter main body 77 is restricted by the arcuate surface 22b, pivoted in an anticlockwise direction, folded over against the arm plate member 76 and is situated inside the space 116 at the backside of the front bezel 22. The shutter main body 77 is pivoted in an anticlockwise direction and is folded such that it is folded over against the arm plate member 76. Accordingly, since the second shutter 75 has a compact structure, the space 116 for accommodating the second shutter 75 requires a small space. Therefore, it is sufficient to prepare a small space for the space 116 and therefore the recording media has compact structure.

Now, an operation of the shutter mechanism 70 upon loading the recording media 10 will be described.

When the recording media 10 is inserted, as shown in FIG. 7B, the first shutter 71 is pressed by the front end surface 17 of the recording media 10 and pivoted in the anticlockwise direction in the figure and is opened. Then, the first shutter 71 is supported by the upper surface 14 of the recording media 10 and is kept at that state.

After the connector 11 is being connected to the connector 40 that is a counterpart of the connector 11 and the recording media holder 30 starts moving in the Y1-direction, the first shutter 71 also moves in the Y1-direction as shown in FIG. 7C. Also, the bottom plate part 32 of the recording media holder 30 gradually moves away from the rib part 76b and the arm plate member 76 starts pivoting in the clockwise direction. When the recording media holder 30 moves further, the base plate part 32 of the recording media holder 30 comes off from the rib part 76b and it will be in a state where the tip of the arm plate member 76 abuts the bottom surface 15 of the recording media 10.

The recording media holder 30 is moved by the holder moving mechanism 60 and the recording media 10 is entirely pulled into the recording media unit 20. Then, as shown in FIG. 8A, the tip side plate part 76d of the arm plate member 76 abuts a corner part 16 formed between the bottom surface 15 of the recording media 10 and the rear end surface 12. Then, the arm plate member 76 is pivoted in a clockwise direction in the figure and the shutter main body 77 moves in the Z1-direction and gradually closes the slot 21 from the Z2-side as shown in FIG. 8B.

In a state where the recording media 10 is accommodated in the recording media unit 20, the second shutter 75 comes to a state shown in FIG. 8C. The arm plate part 76 is pivoted through until it comes to a state where its tip enters the space 115 and abuts the rib part 22a. The corner part 16 of the recording media 10 and the arm plate part 76 are not in contact. The shutter main body 77 is moved in the Z1-direction while being pivoted in a clockwise direction against the arm plate member 76 and closes the slot 21. In FIG. 2, as in the case of the upper recording media unit, the indication part 71b "MEDIA LOADED" is exposed in the slot 21.

The indication part 77a "NO MEDIA" and the indication part 71b "MEDIA LOADED" are provided for indicating the state of the recording media unit to the operator. For example, in a case where a plurality of recording media units are stacked and coupled, the user can visually recognize which of the recording media units the recording media is to be inserted. Accordingly, the recording media is prevented from being mistakenly inserted into the recording media unit in which another recording media is already loaded.

In this state, since the first shutter 71 has been moved in the Y1-direction and the space 115 is unoccupied, the arm plate member 76 is pivoted through a predetermined angle by utilizing the above-mentioned space 115. In other words, the tip of the arm plate member 76 is in the space 115. Accordingly, as compared to a structure in which the space 115 is still occupied by the first shutter 71, the recording media unit 20 becomes compact by the space 115.

It is to be noted that the first shutter 71 abuts the upper surface 14 of the recording media 10 in a substantially horizontal state and is accommodated in the space 131.

Also, the tip side plate part 76d of the arm plate member 76 is situated between the recording media 10 and the slot 21 and also extends in a direction between the Z1 and Y2 direction when viewed from the shaft part 76a.

Now, an operation of the shutter mechanism 70 upon ejecting the recording media 10 will be described.

For ejecting the recording media 10, the shutter mechanism 70 operates in a reverse order of the process described above for a loading operation. That is, starting from the state shown in FIG. 8C, as the ejection operation of the recording media 10 proceeds, the state changes in the order of FIGS. 8B, 8A, 7D, 7C and 7B, and finally, when the recording media 10 is ejected, reaches a state shown in FIG. 7A.

When the ejection operation is performed and the recording media 10 starts moving in the Y2-direction, the corner part 16 presses the inclined tip side plate part 76d of the arm plate member 76. Then, as shown in FIGS. 8B and 8A, the arm plate member 76 is pivoted in an anticlockwise direction, i.e., in a direction that does not obstruct the movement of the recording media 10, against the torsion coil spring 78. That is to say, the recording media 10 moves while displacing the arm plate member 76 in the Z2-direction. When the arm plate member 76 is pivoted in an anticlockwise direction in the figure, the shutter main body 77 moves in the Z2-direction and is retracted from the position of the slot 21, and thereby the slot 21 is opened. Also, the shutter main body 77 smoothly moves while its tip is being guided by the arcuate surface 22b at the backside of the front bezel 22 and is also pivoted in an anticlockwise direction and is folded over, so that the shutter mechanism 70 becomes compact.

As shown in FIG. 7D, the rear end surface 12 side of the recording media 10 passes through the opened slot 21 and protrudes outside the recoding media accommodating unit 20. The arm plate member 76 comes to a state where its tip is abutted to the bottom surface 15 of the recording media 10.

Also, when the recording media holder 30 moves in the Y2-direction, as can be seen in FIGS. 7C and 7B, the bottom plate part 32 engages the rib part 76b, the arm plate member 76 is further pivoted in an anticlockwise direction and the tip of the arm plate member 76 is separated from the bottom surface 15 of the recording media 10. Also, as can be seen in FIG. 7B, the first shutter 71 moves in the Y2-direction and returns to the space 115.

When the recording media 10 is pulled out, the first shutter 71 is returned by being pivoted in a clockwise direction and the slot 21 is closed.

Figure 9A:
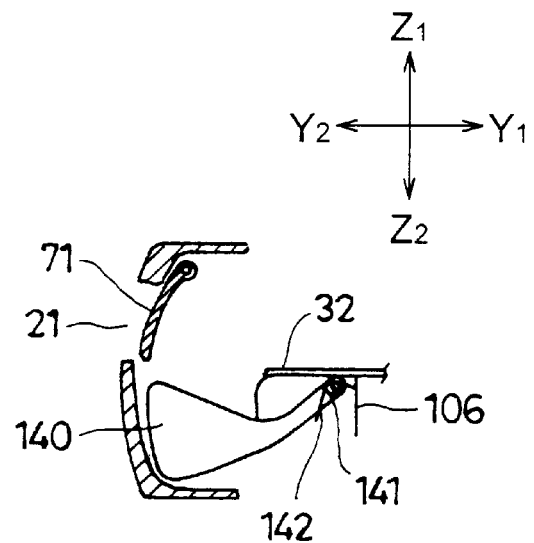
FIGS. 9A and 9B are diagrams showing an alternative embodiment of the shutter mechanism.
Figure 9B:
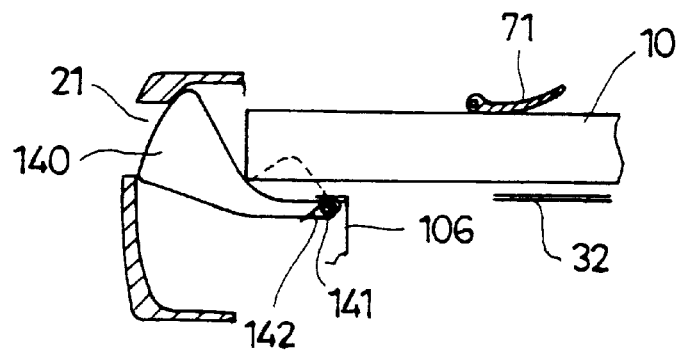

FIGS. 9A and 9B are diagrams showing a further embodiment of an alternative embodiment of the shutter mechanism. A second shutter 146 has a configuration such that the second shutter in the state shown in FIG. 8C and the arm plate member 76 are integrated. The second shutter 140 is supported by a bracket part 106 at the shaft member 141 and is biased in a clockwise direction that is a direction in which the second shutter 140 is closed by means of the torsion coil spring 142.

FIG. 9A shows a state where the recording media 10 is not loaded and the first shutter 71 closes the slot 21. FIG. 9B is as sate where the recording media 10 is loaded. The second shutter 140 is pressed and opened by the recording media 10 that is being ejected.

Further, the present invention is not limited to these embodiments, and variations and modifications may be made without departing from the scope of the present invention.

The present application is based on Japanese priority application No. 2001-370936 filed on Dec. 5, 2001, the entire contents of which are hereby incorporated by reference.

What is claimed is:

1. A recording media unit comprising:
   a slot through which a recording media is inserted into and ejected out of the recording media unit;
   a first shutter, attached to the recording media unit, that closes said slot in a state where said recording media is not accommodated in said recording media unit; and
   a second shutter, pivotably attached to the recording media unit, that closes said slot in a state where said recording media is accommodated in said recording media unit,
   wherein said first shutter is configured to open in accordance with an insertion operation of said recording media in which said recording media pushes said first shutter, and
   said second shutter is configured to rotate about a pivot at one end of the second shutter in accordance with an ejection operation of said recording media in which said recording media pushes said second shutter.

2. The recording media unit as claimed in claim 1, further comprising:
   a recording media holder, attached to the recording media unit, for holding and moving the recording media that is inserted through said slot, said first shutter being supported by said recording media holder,
   wherein, said first shutter moves away from a space proximate to said slot as a result of the insertion operation and, while closing said slot, said second shutter enters said space that had been occupied by said first shutter.

3. The recording media unit as claimed in claim 1, wherein said second shutter includes a shutter main body and an arm member for supporting said shutter main body such that said second shutter is movable between an open position and a closed position, said shutter main body being folded against said arm member when said second shutter is in an open position.

4. The recording media unit as claimed in claim 3, wherein, in said ejection operation, said arm part is pushed by said recording media.

5. The recording media unit as claimed in claim 1, wherein said first shutter is provided with an indication indicating that said recording media is not accommodated in said media unit, said indication being provided at a location visible through said slot in a state where said first shutter closes said slot, and
   said second shutter is provided with an indication indicating that said recording media is accommodated in said media unit, said indication being provided at a location visible through said slot in a state where said second shutter closes said slot.

* * * * *